March 26, 1940.  R. A. A. COUZINET  2,195,025
GAS TURBINE
Filed July 8, 1936  3 Sheets-Sheet 3

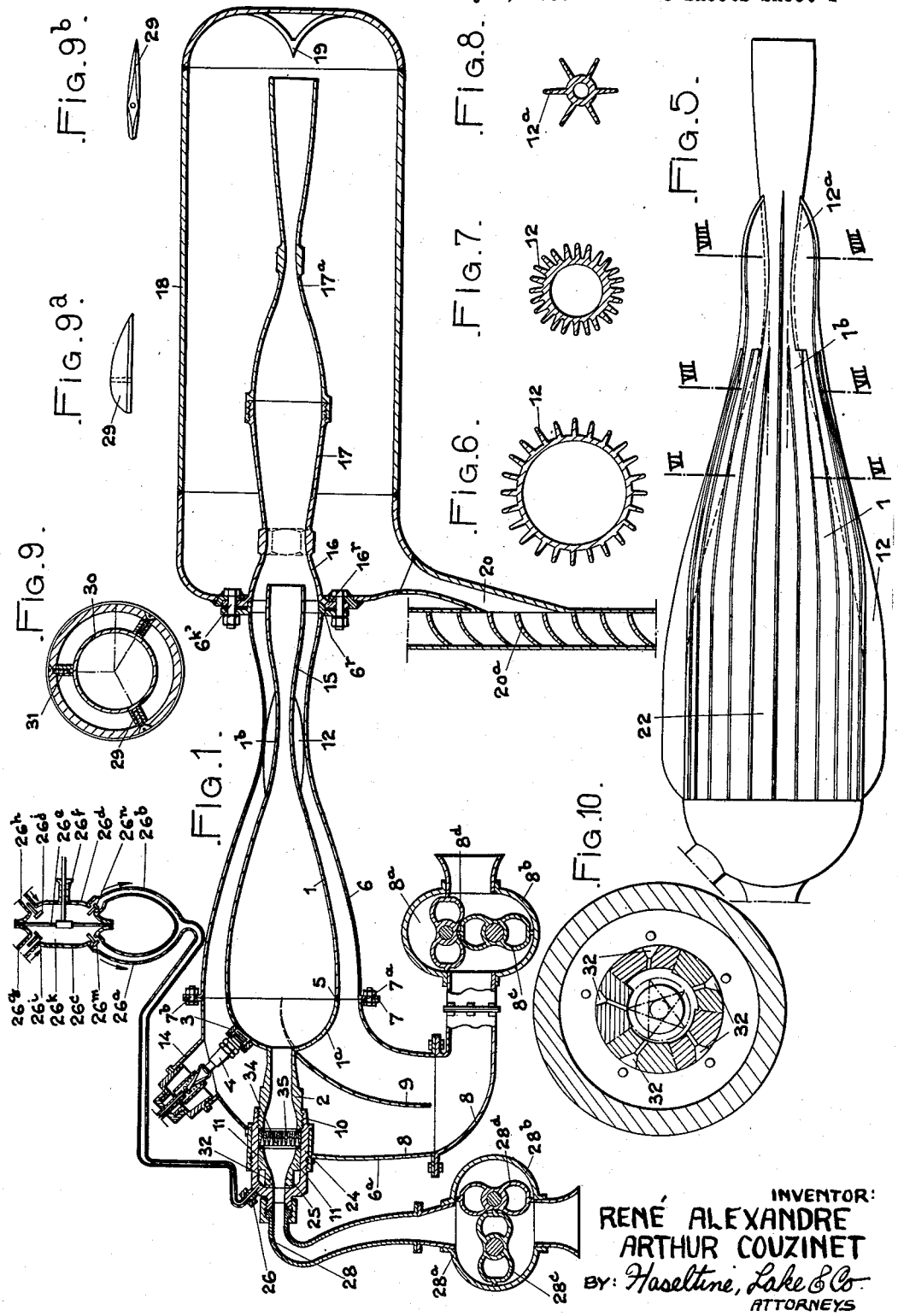

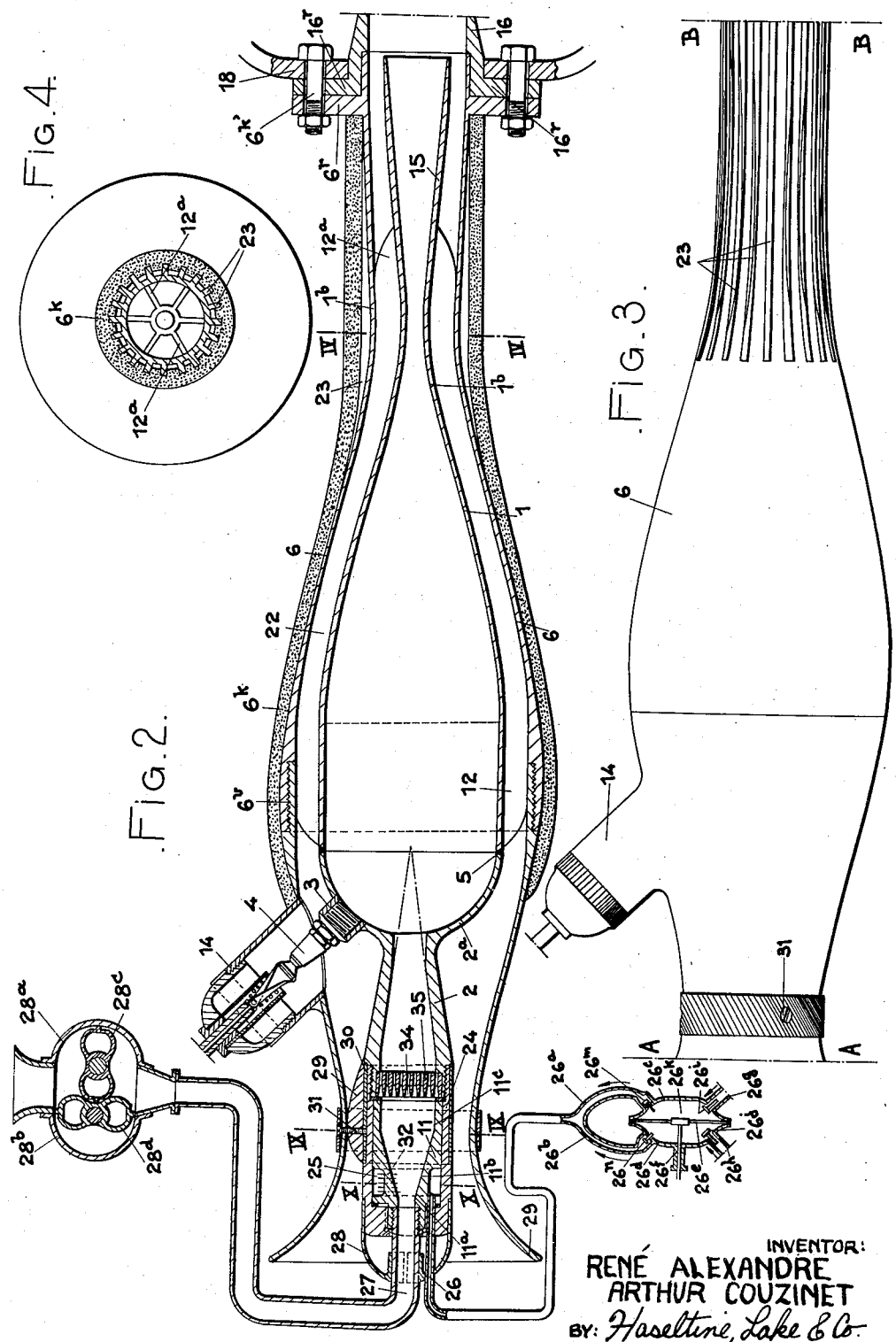

INVENTOR:
RENÉ ALEXANDRE ARTHUR COUZINET
BY: Haseltine, Lake & Co.
ATTORNEYS

Patented Mar. 26, 1940

2,195,025

UNITED STATES PATENT OFFICE 2,195,025

GAS TURBINE

René Alexandre Arthur Couzinet, Neuilly sur Seine, France

Application July 8, 1936, Serial No. 89,571
In France July 17, 1935

1 Claim. (Cl. 60—41)

This invention relates to the technics of gas turbines, and more particularly to the feeding of these turbines.

Devices for feeding gas turbines have already been proposed of the type in which a re-compression tank, from which the compressed gas acts on a turbine, is fed with gas by a combustion chamber in which is injected, from an atomizing chamber and in a continuous manner, a secondary air-fuel mixture arriving through an annular space limited by a casing surrounding the combustion chamber, being mixed with the burnt gases, at the outlet of said chamber and before said gases enter the re-compression tank.

An object of the invention is to provide a device for feeding gas turbines, in which device a re-compression tank, directly connected to the turbine, is supplied with gas by a combustion chamber into which is injected, from an atomizing chamber and in a continuous manner, an air and fuel mixture, air, which is admitted through an annular space limited by a casing surrounding the combustion chamber, being mixed with the burnt gases when they issue from this chamber and before admission of said gases into the tank; the fuel jets, in the atomizing chamber, are regularly distributed about the axis of this chamber but they are set non radially, the walls of the combustion chamber being thin and made of polished rustless steel, the variable sections of passage of the secondary air, about the combustion chamber, having a minimum value on the up side of the outlet of the combustion chamber.

In the accompanying drawings given by way of example only:

Fig. 1 is a general elevation in axial longitudinal section, of a plant for feeding a gas turbine.

Fig. 2 is an axial section of a modification the re-compression tank being partly broken away.

Fig. 3 is an external view of the device illustrated in Fig. 2, the heat insulation being removed and both ends of the device being broken away beyond lines A—A and B—B.

Fig. 4 is a cross section made according to line IV—IV of Fig. 2.

Fig. 5 is an elevation of the front part of the combustion chamber of Fig. 2.

Figs. 6, 7 and 8 are cross sections made respectively according to lines VI—VI, VII—VII and VIII—VIII of Fig. 5.

Fig. 9 is a cross section made according to line IX—IX of Fig. 2.

Figs. 9a and 9b are respectively an elevation and a plan view of a rib for centering the rear part of the combustion chamber in the secondary air casing.

Fig. 10 shows, on an enlarged scale, cross sections taken successively, from X—X of Fig. 2, through planes containing the axes of the conduits used for injection in the primary air stream of the atomising chamber.

Throughout the views the same references indicate the same or corresponding parts or features.

Figure 11:
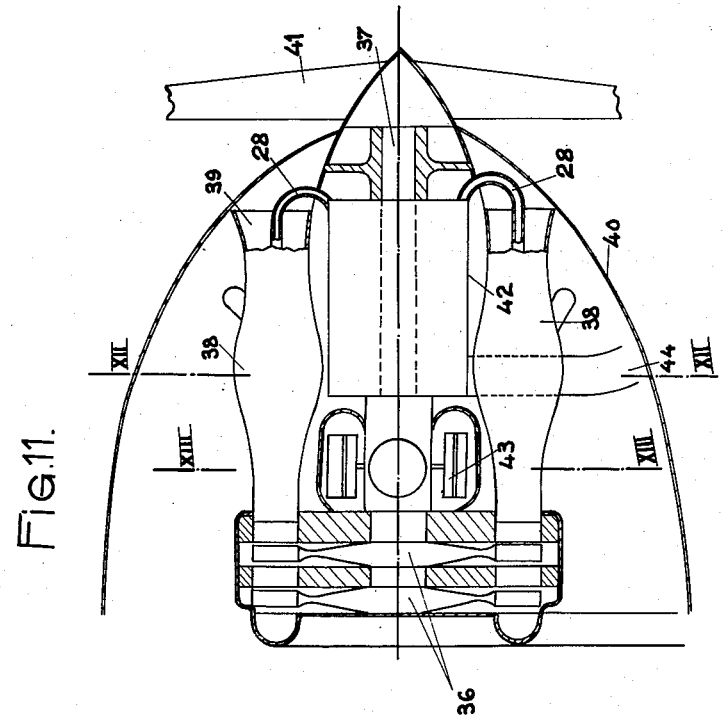
Fig. 11 is a general diagrammatic view of a turbine and of its feeding devices.

The applicant has found, after numerous trials, that the difference of the speeds between the secondary air and the gases issuing from the outlet nozzle of the combustion chamber, was very great. The shock between these two gaseous streams was violent and led to considerable losses.

The applicant has given a solution of this problem by considerably reducing the difference of speed between these gaseous streams, so as to reduce the shock between said streams and, consequently, the value of the conversion into heat resulting therefrom, conversion which is effected to the detriment of total energy. Furthermore, it is advantageous to eliminate to the maximum the calories produced by the losses due to shock.

In the example of Fig. 1, the combustion chamber is a hollow body 1 substantially of spindle shape, having a thin wall, and preferably made of rustless steel polished on both its faces. This body 1 can, for instance, be made in two pieces, one of which, or bottom 1a, carries an axial tube 2 for the admission of carburetted primary air, and one or more internally screw-threaded rings 3 adapted to receive sparking plugs 4. The junction is preferably permanent between the two parts of the body, and can for instance be obtained by autogenous welding 5. The chamber 1 is arranged co-axially with an outer casing 6, also having, preferably, a thin wall internally polished. The casing 6 is made in two pieces connected by flanges 7 and bolts 7a with interposition of a suitable fluid-tight packing. Its rear part 6a has a tube 8 connecting it with the source of secondary air 8a. However, a deflecting wall 9 can be provided for ensuring a uniform distribution of secondary air in the space comprised between the two walls 1 and 6.

The centering of the combustion chamber 1 relatively to the outer casing 6 is ensured: on the one hand, by the tube 2 which is screwed in an internally screw-threaded opening 10 of a sleeve 24 surrounding the atomising chamber 11 secured on the casing 6a and, on the other hand, by ribs 12.

The sparking plugs 4, to which access can be had through openings 14 provided in the casing 6, are arranged at the rear of chamber 1 in the zones where eddies are produced and adjacent to the point of admission of the stream of carburetted primary air blown at a high pressure by the atomising chamber.

This arrangement facilitates the ignition of the jet upon starting, by progressive ignition of a carburetted mixture receiving increasing speeds from the spark point. These zones are maintained, during operation, at a relatively low temperature and the sparking plug bodies, immersed in the second air stream, are sufficiently cooled.

Owing to its small thickness and eventually to its outer polished surface, the wall of the combustion chamber 1 rapidly yields its calories to the secondary air stream and, although the temperature of combustion maintained at the interior is high, this wall is always maintained at an admissible temperature. To these thermal advantages, is to be added the reduction of weight which is always of advantage for the application of the invention to aircraft.

The combustion chamber has a throttled portion 1b followed by a diverging portion 15 which constitutes a gas outlet nozzle. These gases enter a mixing chamber, inlet of which, connected to the front end of the casing, is preferably in the shape of a converging conduit 16 followed by a diverging conduit 17. With this arrangement which, during the trials effected by the applicant has proved to be advantageous, can be obtained:

An intake of secondary air which, even when it is not forced, reaches a considerable speed of flow.

A mixture, coming from the combustion chamber and in which this air and the gases are at a practically constant pressure.

According to an important feature of the invention, the diverging conduit 17 terminates in a converging-diverging conduit 17a and the whole is arranged in a chamber 18 which ensures the following functions:

It constitutes an accumulator-reservoir which regularises the feeding of the turbine.

It acts as a high pressure apparatus which utilises the kinetic energy of the gases for increasing the pressure of the same.

In the example illustrated, the gases, when issuing from the mixing chamber 16 and from the nozzles 17a, strike against a deflector 19 which directs them without formation of eddies, in the direction opposed to their direction of admission, the nozzle or nozzles 20 feeding the turbine 20a being for instance provided in the region of the chamber 18 opposed to the deflector 19.

It will be noted that the atomising chamber 11 provides between it and the sleeve 24, a space 25 in which fuel is admitted, through a conduit 26. A grid or diffuser 35 is interposed between the end of the chamber 11 and the corresponding end of conduit 2. Moreover, the wall of chamber 11 is provided, in the region of the annular space 25, with perforations or injectors 32 putting this space 25 in communication with said chamber 11. The description of these injectors 32 will be made in detail hereinafter with reference to Fig. 2.

The conduit 26 feeding the annular space 25 with fuel is connected by two branch pipes 26a and 26b to a double-acting pump 26k. This double-acting pump, which is of ordinary construction, comprises two shells 26c and 26d peripherally clamping a distortable membrane 26e, connected in its central region to a rod 26f having a reciprocating movement. The fuel is sucked in the pump through conduits 26g and 26h controlled by valves 26i and 26j and said fuel is delivered in the branch pipes 26a and 26b controlled by valves 26m and 26n. Owing to the reciprocating movement of the membrane 26d the fuel is successively delivered in the branch pipes 26a and 26b so as to ensure continuous feeding of the annular space 25 with fuel.

The primary air is admitted in the atomising chamber 11 through the conduit 28 connected to a pump or air compressor 28a. This compressor comprises a casing 28b and two rotors 28c and 28d which mesh with each other.

The secondary air is delivered in the conduit 8 by a pump 8a comprising a casing 8b and two rotors 8c and 8d which mesh with each other.

The securing in position of the casing 6 and the chamber 16 on the tank 18 is ensured by bolts 6k' which engage in corresponding flanges 6r and 16r respectively belonging to the casing 6 and to the conduit 16.

In the constructional modification illustrated in Figs. 2 and 3, the combustion chamber 1 and its outer secondary air casing 6 only have been shown.

As particularly shown in Figs. 5 to 8, the combustion chamber 1 is provided with ribs which are particularly numerous in the portion comprised between the part of maximum diameter of the chamber and the throttled portion 1b. These ribs 12 provide between them longitudinal conduits 22 which guide the secondary air which thus circulates in the form of jets.

In the example illustrated in Fig. 2, the outer casing 6 is provided with longitudinal ribs 23. They do not fulfill any thermal function and can be covered with a heat insulating packing 6k provided on the entire outer surface of the casing 6 which, as previously stated, is conveniently polished on its inner face. The rear portion 2a of the combustion chamber terminates in a converging tube 2 connected, by screwing, to a sleeve 24 in which fits the atomising chamber 11. The latter, the inner face of which presents, from the rear to the front, a cylindrical portion 11a, a conical diverging portion 11b and a cylindrical portion 11c, is provided, at the diverging portion 11b, with an outer groove 25 into which lead one or more tubes 26 connected to the delivery side of the fuel pumps 26k. The primary air is blown into the atomising chamber through a conduit 27 suitably connected to the bottom of the chamber 11, said conduit 27 being connected to a pump or compressor 28a. A cap 28 is secured on the sleeve 24 and its shape is devised from the aerodynamic standpoint for combining with the profile of the secondary air inlet horn 29. The secondary air enters the member 29 owing to the very displacement of the airplane on which the system is mounted. Use might also be made of a pump or compressor 8a as illustrated in Fig. 1.

The centering of the combustion chamber 1 in the casing 6 is effected, on the one hand, by means of the peripheral edges of the ribs 12a and, on the other hand, by the edges of ribs 29 provided on a socket 30 secured in position on the sleeve 24. The ribs 29 are streamlined as particularly shown in Figs. 9a and 9b in order to offer the minimum of resistance to the secondary air and not to give rise to the formation of eddies. In the example illustrated (Fig. 9), the said ribs 29 are three in number and they are held in position by screws 31 passing through the wall of casing 6.

This arrangement is also applied, at least in its principle, to the unit shown in Fig. 1 on which have been marked, for designating the same elements or corresponding elements, the reference numbers used on Figs. 2, 9 and 10.

The communication between the annular space 25 and the mixing chamber is ensured by channels 32 passing through the wall of chamber 11. These channels 32 act as injectors and are arranged, as illustrated in Fig. 10, according to nonradial directions. The primary air laden with fuel passes through converging perforations 34 of a grid 35 interposed at the inlet of the converging tube 2, in order to obtain a homogeneous carburation of the air stream admitted into the combustion chamber where its ignition, upon starting, takes place as already explained with reference to Fig. 2. The total section of the perforations 34 is so computed as not to give rise to appreciable losses of pressure, and the diameter of the grid 35 is chosen accordingly, this necessitating the use of the diverging wall 11b.

It will be noted (Fig. 2) that the combustion chamber is made, as in the example of Fig. 1, in two parts connected at 5. The casing is also made in two parts fitted one in the other at 6v. This casing is secured to the conduit 16 and to the tank 18, as indicated with reference to Fig. 1, by a flange 6r and bolts 6k'. In the example of Fig. 1, the casing 6 is not heat insulated. On the contrary, in Fig. 2, said casing 6 is surrounded by heat insulating material 6k.

The feeding units which have just been described can be grouped according to any desired arrangement, and in any number, for feeding one and the same turbine. Fig. 11 shows, in diagrammatic partial axial section, a turbo-motor unit according to the invention and arranged in the cowl of an airplane.

The turbines are of any suitable type, as the invention aims at the application of known turbines, and particularly of steam or compressed fluid turbines, to the propulsion of vehicles such as aircraft in which the weight and dimensions of the propelling devices must necessarily be relatively reduced, by feeding said turbines by means of gases used up to now for feeding heat-explosion or combustion engines. It is in fact to be noted that engines, having rotors provided with blades providing between them variable spaces in which charges of carburetted air are ignited and caused to expand, and which have been proposed up to now under the name of "gas turbines" are only simple explosion or combustion engines to which are not applicable the principles which have led to the development of the steam or compressed fluid turbines actually giving entire satisfaction.

In the diagrammatic view of Fig. 11, the turbine, simply illustrated with two rotors 36, is provided with several feeding units 38, such as those of Figs. 1 or 2. These feeding units are regularly distributed about the driving shaft 37 and their secondary air inlet 39 is directed forwardly. Between these units and co-axially with the turbine, the shaft 37 of which drives the tractor airscrew 41 are arranged: the primary air compressor 42, which may be of the usual construction, is directly driven by the shaft 37, and the fuel pumps 43, distributed about the shaft 37 and which are actuated by the latter, which pumps can be of the reciprocating type.

The regulation of the working speed is effected, according to one of the features of the invention, by simultaneously acting on the conduit 44 admitting air to the compressor and on the output of the fuel pumps. In the diagrammatic view of Fig. 11, are simply shown a shutter 45 for regulating the admission of air, and a lever 46 regulating the fuel output, these members being controlled from one and the same operating lever 47.

Figure 12:
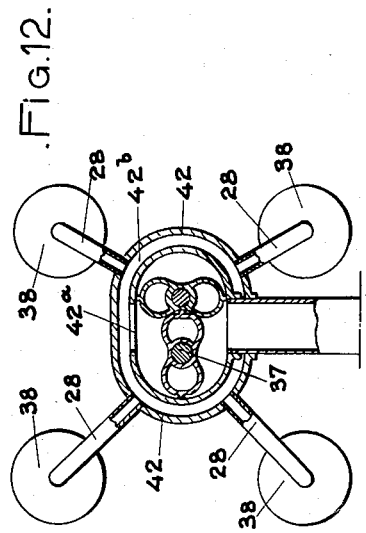
Fig. 12 is a section made according to line XII—XII of the preceding figure, the central part comprising the pump for feeding primary air alone being in section.

Fig. 12 more particularly shows the mounting of the compressor on the shaft 37. This compressor 42 is devised, in particular, as the compressor 28a of Fig. 1 with the only difference that the outlet 42b which communicates with each system 38 by conduits 28.

One of the rotors is rigidly secured on the shaft 37 and the transmission of movement to the second rotor is effected by gears.

Figure 13:
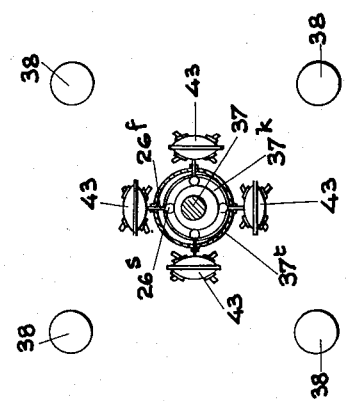
Fig. 13 is a section made according to line XIII—XIII of Fig. 11.

Concerning the pumps 43, the latter are distributed about the shaft 37, as indicated in Fig. 13. Use is made for instance of pumps having a membrane which is identical to the pump 26k illustrated in Fig. 1. In this case the rods 26f are each provided with a roller 26s engaged in a groove 37k forming a cam provided in a flange 37t rigid with the shaft 37.

What I claim as my invention and desire to secure by Letters Patent is:

In a device for feeding gas turbines, in combination: an atomising chamber, means for sending fuel into said atomising chamber, means for sending primary air into said atomising chamber, a combustion chamber supplied with an intimate mixture of fuel and air from said atomising chamber, a nozzle for constituting the outlet of said combustion chamber, a turbine, a tank opening directly into said turbine, a casing surrounding said combustion chamber and said nozzle and so arranged as to provide between it and said chamber with the nozzle, an annular space, means for sending secondary air into said annular space, said casing being extended within said tank and so devised as to constitute converging-diverging elements, and a deflector provided in the tank and opposite the outlet end of said extension of the casing.

RENÉ ALEXANDRE ARTHUR COUZINET.